W. D. POMEROY.
BALANCING TABLE.
APPLICATION FILED NOV. 30, 1906.
1,136,611.
Patented Apr. 20, 1915.
2 SHEETS—SHEET 1.
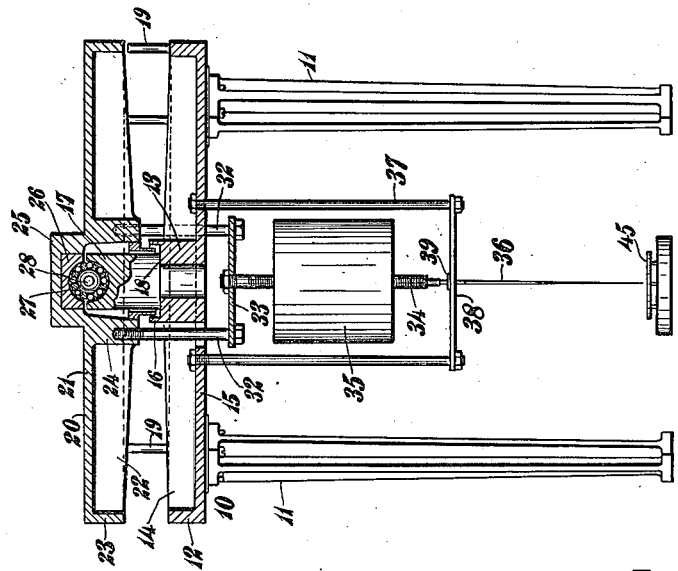
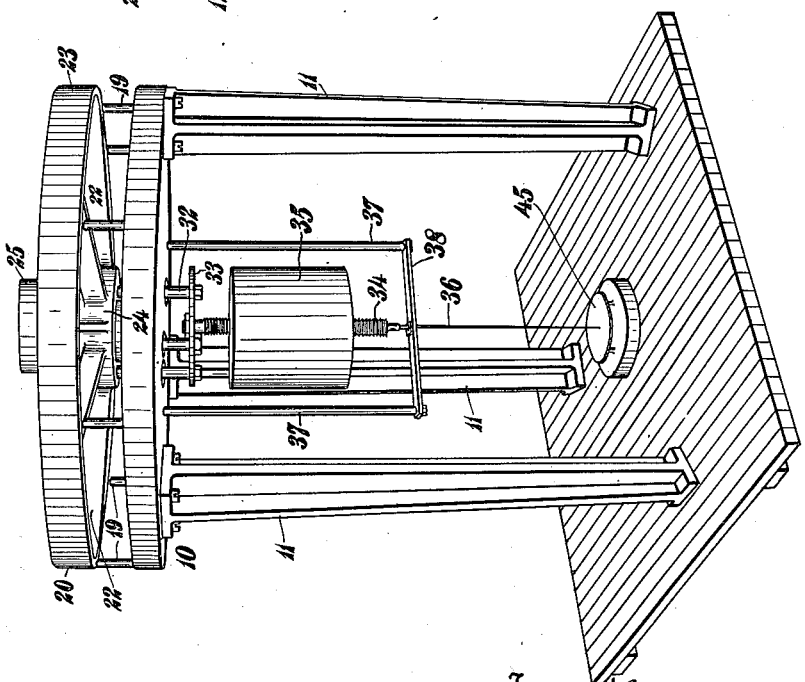
Witnesses
Inventor
William D. Pomeroy
By
Chas. E. Lord
Attorney

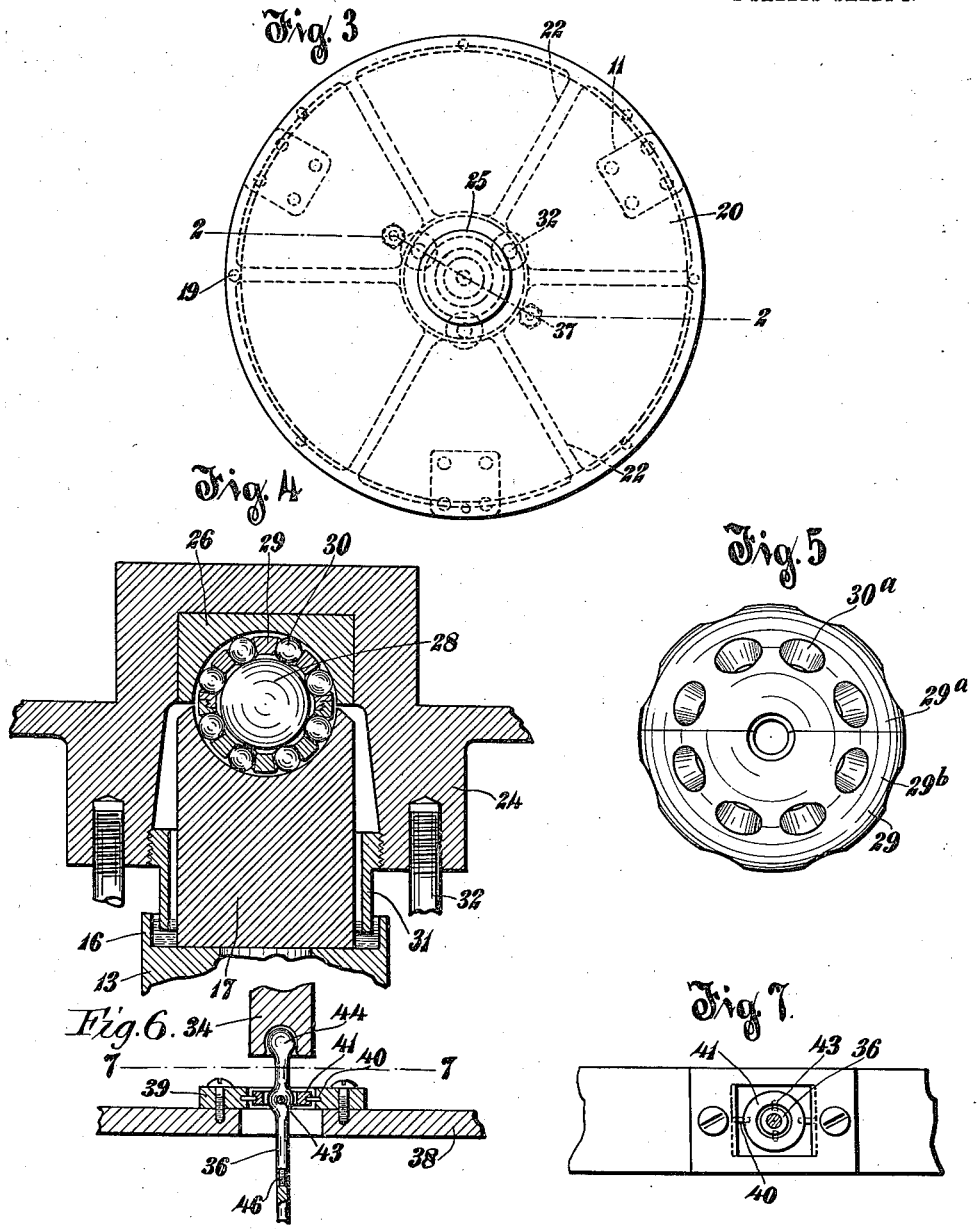

UNITED STATES PATENT OFFICE.

WILLIAM D. POMEROY, OF NORWOOD, OHIO, ASSIGNOR, BY DIRECT AND MESNE ASSIGNMENTS, TO ALLIS-CHALMERS MANUFACTURING COMPANY, A CORPORATION OF DELAWARE.

BALANCING-TABLE.

1,136,611.  Specification of Letters Patent.  Patented Apr. 20, 1915.

Application filed November 30, 1906. Serial No. 345,608.

*To all whom it may concern:*

Be it known that I, WILLIAM D. POMEROY, citizen of the United States, residing at Norwood, in the county of Hamilton and State of Ohio, have invented certain new and useful Improvements in Balancing-Tables, of which the following is a full, clear, and exact specification.

My invention relates to balancing machines or devices for objects intended to be rotated at high speeds.

When a body such as a wheel or disk is to be rotated at very high speeds it is essential that it be first carefully balanced in order that there may be no serious vibration at high speeds. This unbalanced condition may be due to an unequal distribution of the metal or to a greater density of the metal at one place than at another. The increased speeds to which rotating bodies are being subjected render necessary a more accurate balancing than has heretofore been necessary or obtainable.

The object of my invention is to provide a balancing machine or device which is simple in construction and operation and which permits rotary members to be perfectly balanced easily and quickly.

My invention consists in certain novel details of construction and combinations and arrangements of parts described in the specification and set forth in the appended claims.

For a better understanding of my invention, reference is had to the accompanying drawings in which—

Figure 1 is a perspective view of my improved balancing machine; Fig. 2 is a sectional elevation of the same, the section being taken approximately along the line 2—2 of Fig. 3; Fig. 3 is a plan view of the same; Fig. 4 is an enlarged sectional view of the bearing employed; Fig. 5 is an elevation of a ball cage employed in the bearing; Fig. 6 is an enlarged sectional elevation of the device for multiplying the movement of the balancing table; and Fig. 7 is a section of the same along the line 7—7 of Fig. 6.

Referring now to the figures of the drawing, 10 represents a stationary supporting frame or table which rests upon legs 11, in this case three in number. The table is provided in this instance with an outer circular flange 12, a hub 13, radial ribs 14, and with a flat bottom 15. The hub 13 is provided with a circular flange 16, the purpose of which will be explained later. Supported by the hub 13 of the stationary table is a vertical bearing post 17 provided with a portion which extends into the opening of the hub and with a shoulder 18 which rests against the upper face of the hub. The bearing post is provided at its upper end with a spherically curved bearing socket, which in this case is substantially hemi-spherical in shape. The flange 12 is provided with a number of spaced upwardly extending pins 19 the purpose of which is to limit the movement of the movable balancing table as will be more fully explained later.

At 20 is shown a movable balancing table or frame consisting chiefly of a carefully machined flat top 21, radial ribs 22, an outer flange 23, an inner flange 24, and a hub-like extension 25 at the center. The movable balancing table is supported at its center upon the stationary table 10 so as to be able to tilt relatively thereto in any direction. As is shown, within the flange 24 is an opening which receives the upper end of bearing post 17. The hub-like extension 25 is recessed and is provided with a bearing block 26 having a spherical socket 27. The balancing table is supported, in this case, by a spherical bearing which is so constructed that the friction of the engaging parts is almost negligible and which therefore permits very accurate balancing. The bearing consists of an inner sphere or ball 28, (see Figs. 2, 4 and 5) a surrounding, hollow, spherical, perforated, bearing-cage 29 and a number of smaller ball-bearings 30 located within the perforations 30$^a$ of the cage and extending beyond the inner and outer peripheries of the latter so as to bear on the inner ball 28 and against the walls of the spherically curved sockets in the bearing posts 17 and bearing block 26. The ball-cage preferably consists of two parts 29$^a$ and 29$^b$ which are screw threaded together as shown in Fig. 4. It is seen that the ball-cage is free to turn in all directions with the table. The purpose of the ball-cage is to prevent the balls from being crowded away from the bottom of the socket in the bearing post.

The upper edge of the bearing post and the lower edge of the bearing block are close together, there being only a sufficient clearance between the two to prevent contact when the table is tilted. It may be stated that the table is intended to move from the horizontal position only a very small amount, the movement being limited by the pins 19. The lower part of flange 24 carries a circular ring or flange 31 which extends downward into the annular space between the flange 16 and the bearing post 17. This annular space is preferably filled or partially filled with a liquid such as oil as indicated in Fig. 4 so that dust and dirt are thereby prevented from reaching the bearing.

Secured to the flange 24 and passing through openings in the stationary horizontal table 10 are three downwardly extending, equally spaced bolts 32 which carry at their lower ends a plate 33. The holes through which the bolts 32 pass are sufficiently large to permit the bolts to move with the balancing table 20 in any direction. Securely fastened to the center of the plate, in this case being screw threaded thereto, so as to be in line with the center of the movable balancing table and at right angles thereto, is a downwardly extending spindle 34. The spindle is threaded and carries a heavy adjustable weight 35. The purpose of this weight is to bring the center of gravity of the balancing table and of the rotary object being balanced, below the center of the bearing. The spindle also serves another purpose, namely, to transmit the movement of the balancing table to an indicating needle or rod 36 which multiplies or enlarges the movement of the table. The indicating needle is supported on a U-shaped frame consisting of two vertical bolts 37 secured to the stationary supporting frame or table on opposite sides of the flange 13, and a horizontal cross piece 38 supported on the lower ends of the bolts. The needle, in this case, is supported on the cross piece 38 by a gimbal joint so as to be capable of universal movement. The supporting of the indicating needle is shown clearly in Fig. 6. Secured on the cross piece 38 is a plate 39 which is provided with an opening vertically below the center of the balancing table. Supported in this opening by two diametrically opposite pins 40 is a ring 41. The needle is pivoted to this ring by pins 43 at opposite sides thereof and arranged in a plane at right angles to the plane of the pins 40. Thus it is seen that the movement of the table is conveyed to the needle through the spindle 34. It is seen that with this construction, an universal movement can be given the needle about a point which is the intersection of the axes of the pivotal pins 40 and 43. As is clearly shown in Fig. 6 the needle is provided with an enlarged spherical end-portion 44 above the gimbal joint, and the lower end of the spindle 34 is provided with a spherical socket into which the upper end 44 of the needle is located. The length of the needle above the pivot or axis of movement is very much smaller than the length below the axis so that a very slight movement of the spindle 34 will be multiplied many times at the lower end of the needle and this movement can be indicated on a plate 45 directly below the center of the table. As is shown in Fig. 6, the needle consists of two portions screwed together at 46.

The table is first carefully balanced so that the spindle 34 and needle 36 are vertical, after which the member to be balanced is placed on the movable table 20 and centered thereon. If the object on the table is not perfectly balanced, the table will assume a position at an angle to the horizontal, and the movement of the table will be transmitted to the needle 36. Weights can now be added to the lighter side of the member being balanced or one or more holes can be drilled into the heavier side until the needle assumes a vertical position and a perfect balance is obtained. With my improved balancing machine just described, a very slight unbalanced condition of the material composing the rotary member being tested can be detected by the needle and consequently a perfect balance can be obtained.

I do not wish to be confined to the exact details shown but aim in my claims to cover all modifications which do not depart from the spirit and scope of my invention.

What I claim as new and desire to secure by Letters Patent is:—

1. In a balancing device, a stationary horizontal frame or support, a movable table above and supported at its center on said stationary frame so as to be capable of tilting in any direction, said movable table having an upper surface for supporting the article to be balanced, a spindle extending downward from said movable table in line with its center and at right angles to the table, a weight adjustably mounted on said spindle, and means for indicating the tilting of said movable table.

2. In a balancing device, a stationary horizontal frame or support, a movable table above and supported on said frame at its center so as to be capable of tilting in all directions, said movable table having an upper surface for supporting the article to be balanced and means for indicating the position of said table comprising a spindle extending downward therefrom in line with its center and at right angles thereto and a weight adjustably mounted on said spindle.

3. In a balancing device, a stationary frame or support, a movable table, a ball and socket joint supporting said movable table on said frame or support and permitting an universal movement of said table, said movable table having an upper surface for supporting the article to be balanced, and means for indicating the movement of said table.

4. In a balancing device, a stationary frame or table, a bearing-support at its center having a spherical shaped socket, a movable table having also at its center a spherical shaped socket, said movable table having an upper surface for supporting the article to be balanced, a spherical bearing resting in the first named socket and supporting said table and means for indicating the movement of the movable table.

5. In a balancing device, a stationary frame or table having a spherical shaped bearing at its center, a movable table with an upper surface for supporting the article to be balanced, said movable table having a spherical shaped bearing socket resting on said bearing, means for excluding dust or dirt from said bearing, and means for indicating the movements of said latter table.

6. In a balancing device, a stationary frame, a movable table supported on said stationary frame so as to be capable of tilting in all directions, said movable table having an upper surface for supporting an article to be balanced, means for excluding dust or dirt from the bearing surfaces of said frame and table, and means for indicating the movements of said table.

7. In a balancing device, a stationary frame or table, a movable table supported at its center on said stationary table so as to be capable of tilting in any direction, said movable table having an upper surface for supporting the article to be balanced and means for excluding dust or dirt from the bearing surfaces comprising a liquid filled annular receptacle on said stationary table and a ring or circular flange on said movable table and extending downward into the said receptacle.

8. In a balancing device, a stationary table, a movable table supported on said stationary table and having an upper surface for supporting the article to be balanced, each of said parts having oppositely disposed spherical shaped sockets, a bearing within said sockets, said bearing comprising a comparatively large ball or sphere and a plurality of smaller balls, and means for indicating the movement of said movable table.

9. In a balancing device, a stationary table, a movable table supported on said stationary table and having an upper surface for supporting the article to be balanced, each of said tables having oppositely disposed spherical shaped sockets, a bearing in said sockets, said bearing comprising a large inner ball or sphere and a plurality of spaced smaller balls surrounding the large ball, and means for indicating the position of said movable table.

10. In a balancing device, a stationary table and a movable table supported on said stationary table and having an upper surface for supporting the article to be balanced, each of said tables having oppositely disposed spherical shaped sockets, a bearing in said sockets, said bearing comprising a large inner ball or sphere, a plurality of spaced smaller balls surrounding the large ball, and a cage for the smaller balls, and means for indicating the position of said movable table.

11. In a balancing device, a stationary table, a movable table supported on said stationary table and having an upper surface for supporting the article to be balanced, each of said tables having oppositely disposed spherical shaped sockets, a bearing in said sockets, said bearing comprising a large inner ball or sphere, a hollow spherical cage surrounding the ball or sphere, said cage having a plurality of spaced openings or perforations, a ball-bearing located in each opening and extending beyond the inner and outer peripheries of the cage, and an indicating device operated by said movable table.

In testimony whereof I affix my signature, in the presence of two witnesses.

WILLIAM D. POMEROY.

Witnesses:
    Geo. B. Schley,
    Fred J. Kinsey.